United States Patent [19]

Tanemura et al.

[11] Patent Number: 4,954,460
[45] Date of Patent: Sep. 4, 1990

[54] WATER-PERMEABLE CERAMIC MATERIAL

[75] Inventors: Fumikazu Tanemura; Tohru Honda; Shigetoshi Ohta; Yoshiharu Kajita, all of Aichi; Tatsushi Kachi, Tokyo, all of Japan

[73] Assignee: Mino Yogyo Co., Ltd., Mizunami, Japan

[21] Appl. No.: 399,924

[22] Filed: Aug. 29, 1989

Related U.S. Application Data

[63] Continuation-in-part of Ser. No. 274,712, Nov. 21, 1988, abandoned, which is a continuation of Ser. No. 177,872, Apr. 1, 1988, abandoned, which is a continuation of Ser. No. 75,189, Jul. 1, 1987, abandoned, which is a continuation of Ser. No. 824,292, Jan. 23, 1986, abandoned, which is a continuation-in-part of Ser. No. 704,384, Feb. 22, 1985, abandoned.

[30] Foreign Application Priority Data

Feb. 24, 1984 [JP] Japan ............................ 59-33449

[51] Int. Cl.$^5$ .................. C04B 38/00; C04B 33/24
[52] U.S. Cl. ............................. 501/80; 501/141; 501/143; 501/144; 501/155; 106/36
[58] Field of Search .............. 501/80, 141, 143, 144, 501/145, 155; 106/36; 252/62

[56] References Cited

U.S. PATENT DOCUMENTS

| | | | |
|---|---|---|---|
| 3,132,956 | 5/1964 | Lewis | 501/141 X |
| 3,274,310 | 9/1966 | Kohl | 501/141 X |
| 3,389,001 | 6/1968 | Blackburn et al. | 501/80 X |
| 3,824,112 | 7/1974 | Lawrence et al. | 501/80 X |
| 4,481,124 | 11/1984 | Koya et al. | 252/62 |

FOREIGN PATENT DOCUMENTS

| | | | |
|---|---|---|---|
| 6155060 | 12/1981 | Japan | 252/62 |
| 0038365 | 3/1982 | Japan | 501/145 |

Primary Examiner—Karl Group
Attorney, Agent, or Firm—Hovey, Williams, Timmons & Collins

[57] ABSTRACT

A water-permeable ceramic material is made of a porcelain particulate material as the principle component, one or more primary binders selected from starch adhesives, organic binders, clay and water glass, and one or more secondary binders selected from frit, glaze and glass powder. The principal component is selected from one or more porcelain materials including a fired mixture of pottery stone, kaolin and feldspar; porcelain wastes, and other porcelain materials such as road-surfacing porcelain color aggregates, and is classified to have a particles are of relatively high bulk density and very low porosity. The mix is shaped by a pressing machine to a tabular or tubular form suited to the specific use of the final product. The pressure of the pressing machine is adjusted to an amount of 30–200 kg/cm$^2$. After shaping, the resultant compact is sintered at a temperature up to the melting point of the porcelain particles to produce the ceramic material. The ceramic material has a continuous porous structure which provides an effective water-permeable property. The individual particles have interstices therebetween having an average pore diameter of at least 0.1 mm; the composite material has an apparent porosity of 10–53%, a water permeability of at least 50 ml/min.cm$^2$, and a normal incident absorptivity of at least 65% within or throughout the frequency range of 500–5,000 Hz.

3 Claims, 2 Drawing Sheets

WATER-PERMEABLE CERAMIC MATERIAL

This is a continuation-in-part U.S. application Ser. No. 07/274,712, filed 11/21/88 now abandoned; which was a continuation of Ser. No. 07/177,872, filed 4/1/88 now abandoned; which was a continuation of Ser. No. 07/075,189, filed 7/1/87 now abandoned; which was a continuation of Ser. No. 06/824,292, filed 1/23/86 now abandoned; which was a continuation-in-part of Ser. No. 06/704,384, filed 2/22/85 now abandoned.

BACKGROUND OF THE INVENTION

The present invention relates to a water-permeable ceramic material, and more particularly, to a water-permeable ceramic material having good water draining, sound absorbing and anti-slip properties and which hence is particularly suitable for use as a floor structure.

Floors in buildings and outdoor facilities are conventionally made of concrete, asphalt, tiles, stoneware, bricks, interlocking blocks, plastic sheets and a variety of resins. These flooring materials have the following defects.

(1) They are inherently impermeable to water and are unable to absorb or drain water, and, therefore, spilled water or oils or falling rain-drops either stand or flow on the surface;

(2) They become slippery when made wet by water or oils;

(3) Because of their low sound absorbing ability, noise is caused by footsteps or vehicles passing thereover.

The modern world around us contains many places that are constantly exposed to the chance of water or oils spilling or running over them, and among these hazardous places are underground passages, the premises of railway stations, pool sides, public toilets, baths, the tops of buildings, parks, inclined sidewalks and factories. Because of the flooring materials used in these places, they often become slippery when made wet by water, oils or rain, and the number of accidents in which people slip and get hurt is increasingly catching the newspaper headlines. In Japan, the practice of covering roads or streets with concrete or asphalt continues to spread. However, this means that raindrops falling on paved surfaces flow over these surfaces and do not reach the ground itself. Being thus unable to absorb sufficient water to live on, trees along sidewalks or at parks are often withered to death in summer when precipitations are low.

U.S. Pat. No. 4,481,124 relates to thermal shock resistant, porous sound-absorbing ceramic bodies used in walls and in exhaust mufflers. The structure of these prior sound-absorbing ceramic bodies is made up of highly porous ceramic particles surrounded by an inorganic binder to form a matrix. The bulk density of the ceramic particles used in the bodies described in U.S. Pat. No. 4,481,124 is recited as being from 1.2 to 2.0 kg/l. Assuming an average true density of 2.4 kg/l for the individual particles, and applying the standard formula for determining porosity of $$\frac{D_T - D_B}{D_T} \times 100,$$

where $D_T$ is the true density and $D_B$ is the bulk density, the porosity of these individual ceramic particles ranges from about 16.7 to 50%.

SUMMARY OF THE INVENTION:

The principal object, therefore, of the present invention is to provide a material that eliminates simply and effectively the above-described defects of the conventional flooring and paving materials.

In accordance with the present invention, there is provided a water-permeable ceramic material comprising porcelain particles having a particle size in the range of 7–60 mesh, a bulk density of 2.3 kg/l or more and a porosity of up to about 16.7%, and a matrix having a melting temperature lower than a melting point of said porcelain particles, which is formed from one or more primary binders selected from among starch adhesives, organic binders, clay and water glass and one or more secondary binders selected from among frit, glaze and glass powder, said ceramic material having an apparent porosity of from 10 to less than 53%, said matrix having continuous pores connecting front to back of the ceramic material each of which has an average diameter of at least 0.1 mm therein, said ceramic material having a water permeability of at least 50 ml/min·cm$^2$.

Further, in accordance with the present invention, there is provided a method of producing a water-permeable ceramic material comprising mixing porcelain particles having a particle size in the range of 7–60 mesh, a bulk density of 2.3 kg/l or more and a porosity of up to about 16.7%, one or more primary binders selected from among starch adhesives, organic binders, clay and water glass and one or more secondary binders selected from among frit, glaze and glass powder, pressing the resultant mixture under a pressure of 30–200 kg/cm$^2$ and sintering the resultant compact at a predetermined temperature.

The constitution of the present invention is described in detail hereinbelow.

In accordance with the present invention, one or more porcelain particles including (A) a fired mixture of pottery stone, kaolin and feldspar; (B) porcelain wastes such as pottery waste, glass waste, tile waste, stoneware waste; and (C) other porcelain particles such as road-surfacing porcelain color aggregates, are ground and classified to have a fairly narrow size distribution ranging from 7 to 60 mesh (2.83–0.25 mm). These classified particles are used as the principal component of the water-permeable ceramic material of the present invention. Advantageously, the porcelain particles should have a bulk density of greater than 2, and more preferably about 2.3 to 2.5 kg/l. Also, the individual particles should be of very low porosity, with a maximum of about 16.7%, and more preferably up to about 5%.

In order to provide good shape retention, this principal component is mixed with one or more primary binders selected from among known starch adhesives, organic binders, clay and water glass, and additionally, with one or more secondary binders (sintering aid) selected from among frit, glaze and glass powder. The mix is then shaped to a tabular or other form suited to the specific use of the final product. The shaping is executed under a pressure as low as possible, that is, 30–200 kg/cm$^2$, more preferably 30–100 kg/cm$^2$, so that the apparent porosity is 10–53%, while controlling the volume of the compact and the weight of the mix. It is the most significant point of the present invention to determine the degree of the compressing pressure by means of a fine adjustment thereof according to the relationship between the weight of the mix, the volume of the compact (the thickness of the plate, when the compact is planar) and the compressing pressure value. This amount of pressure is significantly lower than a conventional pressure amount, i.e., 500 kg/cm$^2$ to 1 ton/cm$^2$. The resultant compact is then sintered at a temperature below the melting point of the starting porcelain particles to form the ceramic material of the present invention. As the compact is sintered after being pressed under a very low degree of pressure in the present invention, when the binders become close to melting at the early stage of the sintering, it adhere to the periphery of the starting particles. When the temperature further goes up the binders condense by surface tension to the points at which the binders adhere to the starting particles, thereby forming pores in the matrix. Additionally, since the starting particles have a high degree of bulk density, that is, the starting particles contain a small amount of pores therein, the melted binders do not migrate into the particles, thereby forming pores in the matrix as desired. The so formed ceramic material according to the present invention has a continuous porous structure in which a large number of pores connecting front to back of the body of the ceramic material are formed in the matrix. Further, each of the pores has an average pore diameter of at least 0.1 mm, and the ceramic material has an apparent porosity of 10–53%, more preferably 30–45%, a water permeability of at least 50 ml/min·cm$^2$ and a normal incident sound absorptivity of at least 65% within or throughout the frequency range of 500–5,000 Hz. The "water permeability" as used herein means the amount of water penetration through a thickness of 20 mm per unit of time and area at a differential pressure of 200 mm H$_2$O.

In the present invention, one or more porcelain materials are used as the principal component of the water-permeable ceramic material, and this component is conditioned to have a relatively narrow size distribution ranging from 7 to 60 mesh. The reasons for requiring these features are as follows.

(1) By conditioning the principal component to have the stated narrow size distribution, the interstices between each particle are controlled to provide a continuous porous structure having an average pore diameter of at least 0.1 mm, a porosity for the composite material of 10–54% and a water permeability of at least 50 ml/min·cm$^2$.

(2) The so conditioned particulate material provides a uniformly rough surface on the final product, which ensures a sufficiently high frictional resistance to prevent any slip on water or oils.

(3) The continuous porous structure having a porosity of 10–53% ensures a normal incident absorptivity of at least 65% within or throughout the frequency range of 500–5,000 Hz.

(4) Particles coarser than 7 mesh give a product of low mechanical strength whereas a particle size finer than 60 mesh produces impractically small pores having a water permeability of less than 50 ml/min·cm$^2$.

(5) The relatively low porosity porcelain material itself has a relatively small water absorption that permits the reduced use of a sintering aid. In addition, this material is strong and provides high wear resistance for the final product.

In order to obtain a product having a desired color, two or more porcelain materials having different colors may be mixed in suitable proportions to provide the principal component without prejudice to the purpose of the present invention.

The sintering aid used in the present invention is selected from among frit, glaze and glass powder since these materials become liquid at fairly low temperatures and they tend to be localized at the point of contact between individual particles in the principal component without clogging the interstices of the particles. Although the amount of the secondary binders should preferably be 5–20% by weight, if the principal component consists of ceramic wastes or other materials that contain a high proportion of liquid-phase and which are easily sinterable, the use of a sintering aid can be reduced or eliminated entirely.

A ceramic pigment or a color glaze may be used for the purpose of providing a desired color to the product, and they are also effective in improving the aesthetic appeal of the structure treated by the ceramic material of the present invention.

It should also be understood that in order to provide a better water permeability, the respective components may be mixed in the presence of a suitable amount of one or more organic materials without departing from the scope and spirit of the present invention.

DETAILED DESCRIPTION OF THE PREFERRED EMBODIMENTS

Figure 1:
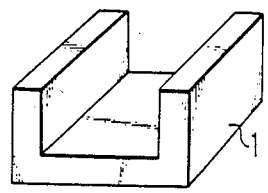
FIGS. 1 to 4 show embodiments of the structure made from the water-permeable ceramic material in accordance with the present invention.
Figure 2:
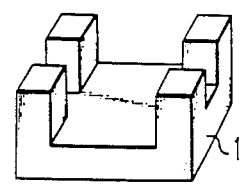
Figure 3:
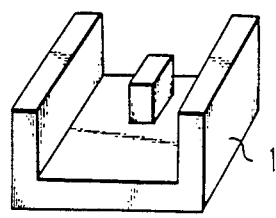
Figure 4:
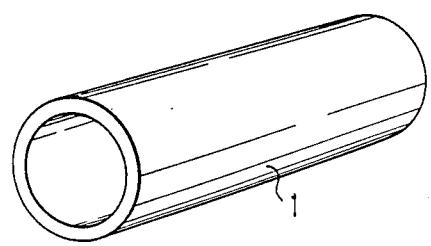

FIGS. 1 to 4 show embodiments of the structure of the water-permeable ceramic material that is prepared by conventional press-forming and sintering techniques. FIG. 1 shows a structure having a U-shaped cross section, FIG. 2 a structure with four legs, FIG. 3 a structure intermediate between FIG. 1 and FIG. 2, and FIG. 4 illustrates a tubular structure. It should, however, be noted that various other modifications are possible with respect to the shape of the structure made from the water-permeable ceramic material in accordance with the present invention.

Figure 5:
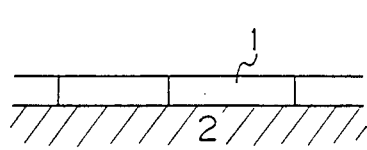
FIGS. 5 to 9 illustrate how the water-permeable ceramic material of the present invention is used to exhibit its advantages.
Figure 6:
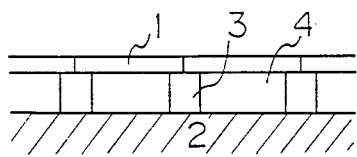
Figure 7:
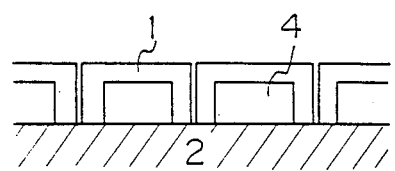
Figure 8:
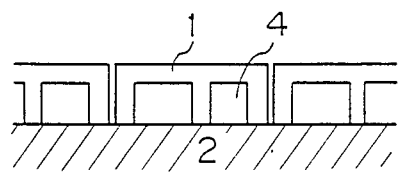
Figure 9:
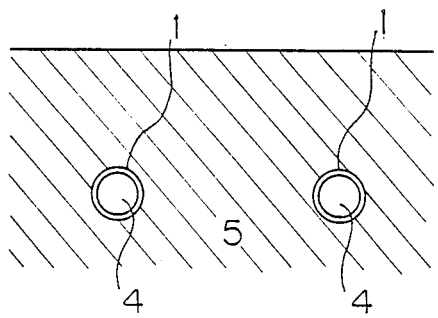

Another important feature of the present invention is that even an existing floor can be readily provided with improved water draining, anit-slip and sound absorbing properties by installing the water-permeable ceramic material shown above. Exemplary installation methods are shown in FIGS. 5 to 6. As shown in FIG. 5, the material indicated at 1 may be simply laid on the floor structure or ground surface 2 either directly or indirectly with an intervening rubber, plastic, mortar or adhesive layer. As shown in FIG. 6, pedestals 3 may be placed under the layer of the water-permeable ceramic material 1. Providing a space 4 under the layer of ceramic material 1 is effective in ensuring an enhanced sound absorption in the frequency range of 500–2,000 Hz.

The use of the water-permeable ceramic material in accordance with the present invention is not limited to its application to floors; it may also be used to form a water-permeable paving sheet to be laid on sidewalks or within parks. Additionally, the ceramic material of the present invention may be shaped into a tubular form and buried in the ground 5 for use as a covered conduit 1 or pipe for supplying water to a vinyl-covered greenhouse. The water-permeable ceramic material of the present invention may also be used as a tree protector or a curbstone for paved areas.

The advantages of the present invention are described in more detail by reference to the following examples, to which the scope of the present invention is by no means limited.

EXAMPLE 1

Pottery wastes which comprised major industrial wastes from Seto and other earthenware and porcelain producing districts in Japan were collected, ground and classified to particle sizes in the range of 12–16 mesh. A hundred parts by weight of the classified pottery wastes were mixed with 10 parts by weight of starch adhesive, as well as with 6 and 0.7 parts by weight, respectively, of a glazing material and a ceramic pigment, each being in a powder form. The resulting mix was press-formed into the shape shown in FIG. 1. The forming pressure is 50 kg/cm$^2$. The shaped mix was fired through a tunnel kiln at a maximum temperature of 1,200° C. for a retention time of 50 minutes. The properties of the fired product are shown in Table 1.

EXAMPLE 2

A road-surfacing porcelain color aggregate was conditioned to a particle size of 10–16 mesh. A hundred parts by weight of the particulate aggregate was mixed successively with 10 parts by weight of starch adhesive and 10 parts by weight of frit powder. The resulting mix was press-formed into the two shapes shown in FIGS. 2 and 4 by a pressing machine which is adjusted to 72 kg/cm$^2$, and the shaped mixes were fired through a tunnel kiln at a maximum temperature of 1,000° C. for a retention time of 50 minutes. The properties of the fired products are shown in Table 1.

EXAMPLE 3

A mixture of pottery wastes particles (60 parts by weight, 12–16 mesh) and road-surfacing porcelain color aggregate particles (40 parts by weight, 10–16 mesh) was successively blended with 10 parts by weight of starch adhesive and 10 parts by weight of frit powder. The so prepared mix was press-formed into a sheet 30 mm thick by a pressing machine which was adjusted to 34 kg/cm$^2$ and fired through a tunnel kiln at a maximum temperature of 1,100° C. with a retention time of 50 minutes. The properties of the fired sheet are shown in Table 1.

TABLE 1

|  | Example 1 | Example 2 | Example 3 |
|---|---|---|---|
| Pottery wastes (12–16 mesh) | 100 |  | 60 |
| Road-surfacing porcelain color aggregate (10–10 mesh) |  | 100 |  |
| Ceramic pigment (fine powder) | 0.7 |  |  |
| Glazing material (powder) | 6 |  |  |
| Frit (powder) |  | 10 | 10 |
| Starch adhesive (gel) | 10 | 10 | 10 |
| Average pore diameter (mm) | 0.32 | 0.37 | 0.34 |
| Apparent porosity (%) | 34 | 33 | 31 |
| Water permeability (ml/min.cm$^2$) | 244 | 252 | 247 |

The water-permeable ceramic material prepared as shown above may be applied to the surfaces of pool sides (conventionally covered with tiles), inclined sidewalks (typically paved with asphalt), the floor of shower rooms, public toilets, underground passages, parks, or the tops of buildings for the purpose of providing good water draining, anti-slip and sound-absorbing properties. When it is shaped into a tubular form, the water-permeable ceramic material in accordance with the present invention may also be buried in the ground and used as a covered conduit that provides a greater water draining ability than the existing clay pipes, concrete pipes or synthetic resin pipes. Conversely, the ceramic material of the present invention may be used to form a pipe that supplies water to a vinyl-covered greenhouse, or feeds agrichemicals to the ground, or furnishes water to irrigate a desert zone. Alternatively, the water-permeable ceramic material of the present invention may be shaped into a tubular or block form which is used either as a tree protector or as a curbstone that helps promote the growth of trees, plants and flowers.

As explained, the present invention makes use of relatively high bulk density, very low porosity porcelain particles; these particles are sintered to provide interstices between respective particles, with an average pore diameter of at least 0.1 mm. This interstitial structure has been found to give desirable water permeability and drainage characteristics in the final composite product.

On the other hand, use of relatively low bulk density, high porosity ceramic particles in an essentially void-free surrounding matrix, as exemplified by U.S. Pat. No. 4,481,124, would be entirely inappropriate for the purposes of the present invention. The greater part of the pores present in such prior composite bodies is believed to be within the individual ceramic particles themselves, as compared with the interstitial porosity of the composite material of the present invention. Accordingly, the material disclosed herein, by virtue of its fundamentally different internal structure, has excellent water permeability and draingage characteristics which apparently cannot be duplicated using the prior composite bodies.

What is claimed is:

1. A water-permeable ceramic material comprising porcelain particles having a particle size in the range of 7–60 mesh, a bulk density of 2.3 kg/l or more and a porosity of up to about 16.7%, and a matrix having a melting temperature lower than a melting point of said porcelain particles, which is formed from one or more primary binders selected from the group consisting of organic binders, clay and water glass and one or more glassy secondary binders, said ceramic material having an apparent porosity of from about 10 to less than 53%, said ceramic material having continuous pores connecting front to back of the ceramic material each of which has an average diameter of at least 0.1 mm therein, said ceramic material$_2$ having a water permeability of at least 50 ml/min cm$^2$, said ceramic material being formed by mixing said particles with said primary and secondary binders, compressing the resultant mixture under a pressure of from about 30–200 kg/cm$^2$, and sintering the compressed mixture.

2. A water-permeable ceramic material according to claim 1 which is in the form of a tube suitable for burial in the ground for supplying water into the ground or draining the same for the ground.

3. A water-permeable ceramic material according to claim 1, in which said porosity of said particles is up to about 5%.

* * * * *